(12) United States Patent
McFarland (10) Patent No.: US 8,246,831 B2
(45) Date of Patent: Aug. 21, 2012

(54) DIGESTING AND CONTINUOUSLY SELF-CLEANING AQUARIUM FILTER

(76) Inventor: Martin Allen McFarland, Boulder, CO (US)

( * ) Notice: Subject to any disclaimer, the term of this patent is extended or adjusted under 35 U.S.C. 154(b) by 372 days.

(21) Appl. No.: 12/700,693

(22) Filed: Feb. 4, 2010

(65) Prior Publication Data

US 2010/0193432 A1  Aug. 5, 2010

Related U.S. Application Data (60) Provisional application No. 61/206,873, filed on Feb. 5, 2009.

(51) Int. Cl.
*A01K 63/04* (2006.01)
*C02F 3/30* (2006.01)

(52) U.S. Cl. ... 210/630; 210/618; 210/905; 210/167.22; 210/167.26; 119/261

(58) Field of Classification Search ............ 210/167.21, 210/167.22, 167.25, 167.26, 167.27, 605, 210/616, 618, 630, 905, 617; 119/260, 261
See application file for complete search history.

(56) References Cited

U.S. PATENT DOCUMENTS

| | | |
|---|---|---|
| 3,360,129 A | 12/1967 | Powers |
| 3,855,120 A | 12/1974 | Garbo |
| 4,009,099 A | 2/1977 | Jeris |
| 4,054,524 A | 10/1977 | Mackrie et al. |
| 4,182,675 A | 1/1980 | Jeris |
| 4,233,702 A | 11/1980 | Zweifel |
| 4,370,233 A | 1/1983 | Hayes et al. |
| 4,390,422 A | 6/1983 | Mackrie et al. |
| 4,620,929 A * | 11/1986 | Hofmann ............... 210/610 |
| 4,725,353 A | 2/1988 | Whitman |
| 4,782,843 A | 11/1988 | Lapaglia |
| 4,894,149 A | 1/1990 | Block |
| 5,062,951 A | 11/1991 | Tominaga |
| 5,078,867 A | 1/1992 | Danner |
| 5,122,267 A | 6/1992 | Giovanetti et al. |
| 5,172,650 A | 12/1992 | Hsu et al. |
| 5,282,980 A | 2/1994 | Kew et al. |
| 5,300,225 A | 4/1994 | Fischer |
| 5,484,525 A | 1/1996 | Mowka, Jr. |
| 5,527,455 A | 6/1996 | Hoffa |
| 563,288 A | 5/1997 | Gargas et al. |
| 573,604 A | 4/1998 | Phillips et al. |
| 574,692 A | 5/1998 | Gargas et al. |
| 584,642 A | 12/1998 | Whitman |
| 587,956 A | 3/1999 | Roberson |
| 596,501 A | 10/1999 | Suchowski et al. |

(Continued)

FOREIGN PATENT DOCUMENTS

JP          7-144200 A  *  6/1995

*Primary Examiner* — Fred Prince (57) ABSTRACT

A method and system for filtering water in aquarium tanks comprising: a macerating/comminuting chamber with a continuously self-cleaning screen covering the discharge outlet that only allows, optimally sized, easily digestible, organic material to pass out of the macerating/comminuting chamber and into an, optionally self-cleaning, media containing denitrifying microbes. There are three different embodiments that use the method of the current invention. These comprise: a reverse flow under-gravel filter apparatus with the macerating/comminuting chamber and filter screen on the discharge side of the pump, a reverse flow under-gravel filter apparatus with the macerating/comminuting chamber and filter screen on the inlet side of the pump, and an external box filter apparatus with the macerating/comminuting chamber on the discharge side of the pump.

20 Claims, 6 Drawing Sheets

U.S. PATENT DOCUMENTS

| | | |
|---|---|---|
| 598,514 A | 11/1999 | Liu |
| 605,888 A | 5/2000 | Rawls |
| 608,030 A | 6/2000 | Gomi |
| 614,318 A | 11/2000 | Roberson |
| 617,148 A | 1/2001 | Lee et al. |
| 626,977 A1 | 8/2001 | Rawls |
| 701,413 A1 | 3/2006 | Heinzelmann et al. |
| 710,509 A1 | 9/2006 | Choo |
| 714,778 A1 | 12/2006 | Gordie |
| 715,343 A1 | 12/2006 | Tunnacliffe et al. |

\* cited by examiner

DIGESTING AND CONTINUOUSLY SELF-CLEANING AQUARIUM FILTER

RELATED APPLICATION

The present application claims the benefit under title 35 United States Code, Section ii 9(e) of U.S. provisional application No. 61/206,873 filed Feb. 5, 2009 entitled "Digesting filtration system with a comminuting chamber and self-cleaning inline micro-screen filtered chamber outlet".

BACKGROUND OF THE INVENTION

1. Field of the Invention

The present invention generally relates to the field of filtration of aquarium water, and is specifically a continuously self-cleaning method and systems for treating organic waste in aquarium water by collecting, macerating, screening it to a digestible size, and subjecting it to denitrifying microbes within a media, to breakdown and digest the organic waste, before returning the treated water to the aquarium.

2. Description of the Prior Art

There are many different systems and methods for breaking down or filtering waste material in aquarium water. Some of which contain similarities to the present invention in how they break down the waste, self-clean, screen the outlet material, and subject the waste to a denitrifying microbe media to complete the nitrogen cycle, or digest the waste. These similar systems include protein skimmers, aerating filters, fluidized bed filters, micro screen filters, self-cleaning filters, and under-gravel filters. Despite the variety of similar systems in the prior art, they are all deficient in being able to continuously go through a complete digestion cycle to remove organic waste from aquarium water for extended periods of time without complexity, or regular cleaning and maintenance.

Protein skimmers, Fractionators, Aerating filters, and "water polishing filters" use bubbles to break down waste, and separate proteins from aquarium water. The most similar example to the present invention is U.S. Pat. No. 5,078,867 that discloses an aquarium filter with a protein skimmer, mechanical filter, and bio media wheel, in series. This design does not have the ability to macerate the incoming organic material into a size small enough to be readily digested by microbes. The mechanical filter that removes large particles does not self clean, and therefore, has to be frequently cleaned or replaced.

Fluidized bed filters, bead bed filters, and bio media filters use comminution and biological microbe systems to break down waste products. Most are dependent on specific gravity to separate the treated fluid from the media. Some have screens to prevent the comminuting balls or beads for exiting the treatment chamber. However, none of them teach a macerating/comminuting chamber with a continuously self-cleaning screen covering the discharge outlet that only allows, optimally sized, easily digestible, organic material to pass out of the macerating/comminuting chamber and into a media containing denitrifying microbes.

U.S. Pat. No. 7,153,430 discloses a biological digestion method that uses a particle comminuting step to reduce the size of the treated material to less than 10 micrometers, before it is subjected to microbes. Tunnacliffe et al. teaches using cavitation, shear forces, high-speed stirrers, contra flow spiral baffles or vanes, contra-rotating paddles, and ball mills to reduce the size of the material to be treated. Tunnacliffe et al. also teaches the benefits of reducing the organic material to a size digestible by microbes. However, Tunnacliffe et al. does not teach a macerating/comminuting chamber with a continuously self-cleaning screen covering the discharge outlet that only allows, optimally sized, easily digestible, organic material to pass out of the macerating/comminuting chamber and into a media containing denitrifying microbes.

U.S. Pat. No. 6,080,304 teaches pumping water into a casing filled with fluidized pieces to clarify aquarium water. Gomi's device teaches us that, when the fluidized pieces are intended to be the substrate for denitrifying microbes, high speed impacts between the pieces should be minimized to keep from injuring the microbes and shearing them off of the fluidized pieces. This system would not be advantageous in a high speed macerating/comminuting chamber designed to pulverize organic material. The screen covering the outlet of Gomi's treatment chamber is only intended to keep the fluidized pieces from exiting. Gomi's system also teaches using a prefilter on the electric submersible inlet that requires regular cleaning. Gomi does not teach a macerating/comminuting chamber with a continuously self-cleaning screen covering the discharge outlet that only allows, optimally sized, easily digestible, organic material to pass into a media containing denitrifying microbes.

Many filters use micro screens to filter out large particles, but most of these are subject to blockages and must be cleaned regularly. Some of the filter systems have self-cleaning or automatic cleaning features but these are predominantly back flush systems that require the system to shut off while fluid flows backwards through the filter. Clearly, the ability of the present invention to continuously self-clean without having to stop for a back flush cycle is a huge improvement.

Reverse flow under-gravel filters become blocked when large waste particles become stuck in them. To prevent blockages and dead spots, they require some sort of pre-filter to keep large particles from entering and clogging the under-gravel filter media. Since the current invention only allows, optimally sized, easily digestible organic material to pass out of the macerating/comminuting chamber, the exiting organic material is small enough to pass into the bottom of the under-gravel filter bed and not clog the spaces between the gravel.

It will be seen that the method and systems for digesting organic waste in aquarium water of the present invention provides a solution to the aforementioned and below described problems, by providing a continuously self-cleaning method and systems for treating organic waste in aquarium water by collecting, macerating, screening it to a digestible size, and subjecting it to denitrifying microbes within a media, to breakdown and digest the organic waste, before returning the treated water to the aquarium.

BRIEF SUMMARY OF THE INVENTION

Therefore the object of the present invention to provide a method and systems for filtering water in aquarium tanks comprising: a macerating/comminuting chamber with a continuously self-cleaning screen covering the discharge outlet that only allows, optimally sized, easily digestible, organic material to pass out of the macerating/comminuting chamber and into an, optionally self-cleaning, media containing denitrifying microbes.

Another object of the present invention is to provide apparatus that meet the diverse needs of aquarium users. To achieve this object, there are three different embodiments that use the method of the current invention. They are: a continuously self-cleaning reverse flow under-gravel filter apparatus with a macerating/comminuting chamber and micro filter screen on the discharge side of the pump; a continuously self-cleaning reverse flow under-gravel filter apparatus with a macerating chamber and micro filter screen on the inlet side of the pump; and a continuously self-cleaning external box filter apparatus with a macerating/comminuting chamber and micro filter screen on the discharge side of the pump.

These and other objects of the present invention will become apparent to those skilled in the art, from the following detailed description and accompanying drawings, showing the contemplated novel construction, combination, and elements as herein described, and more particularly defined by the appended claims, it being understood that changes in the precise embodiments to the herein disclosed invention are meant to be included as coming within the scope of the claims, except insofar as they may be precluded by the prior art.

BRIEF DESCRIPTION OF THE DRAWINGS

The accompanying drawings, which are incorporated in and form a part of this specification, illustrate complete preferred embodiments of the present invention according to the best modes presently devised for the practical application of the principles thereof, and in which.

DETAILED DESCRIPTION OF THE INVENTION

In the accompanying drawings like reference characters designate like or corresponding parts in the several drawing figures.

Figure 1:
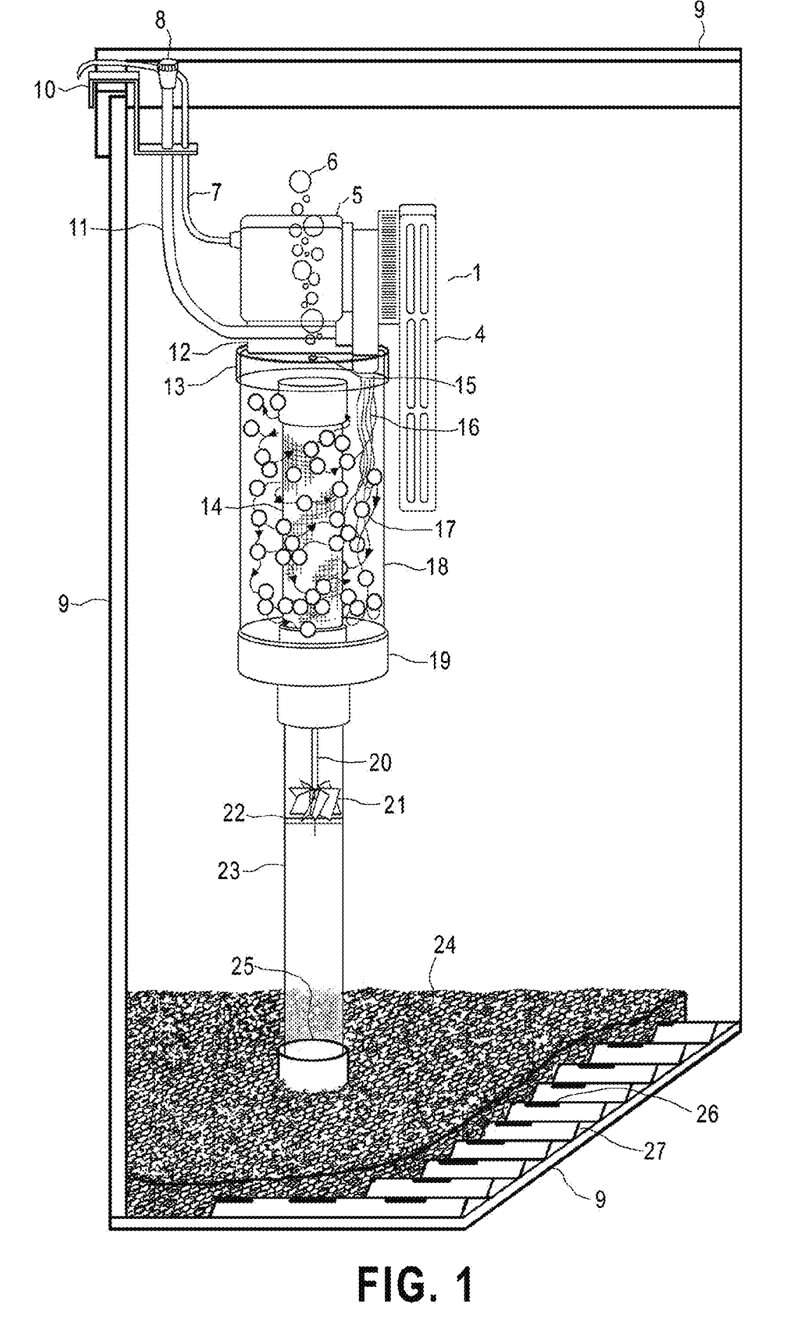
FIG. 1 shows a front perspective view of the first embodiment of the filter system, an under-gravel filter with the waste grinder and micro screen on the discharge side of the pump.
Figure 2:
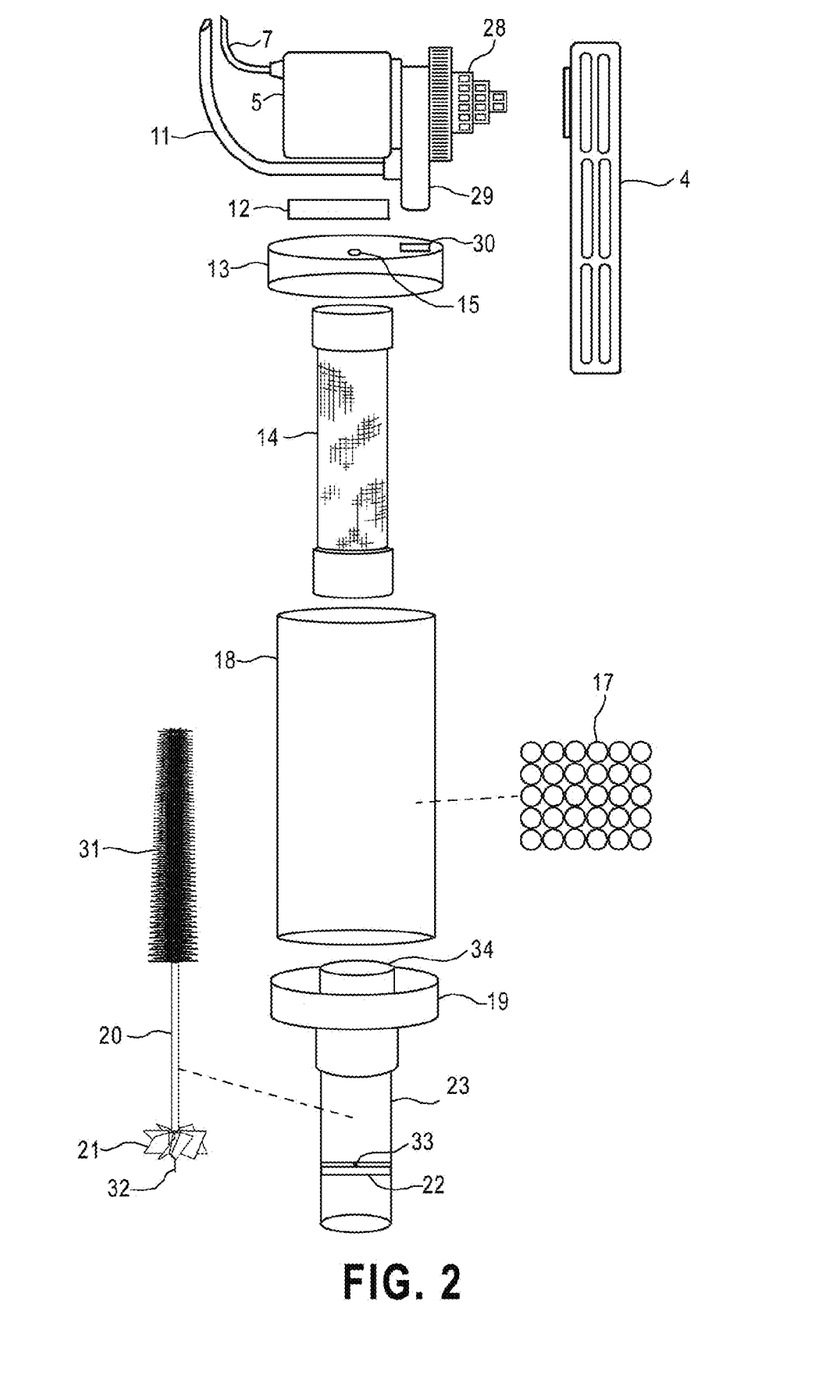
FIG. 2 shows an exploded perspective view of the first embodiment.

Continuously Self-Cleaning Reverse Flow Under-Gravel Filter Apparatus With a Macerating/Comminuting Chamber and Micro Filter Screen on the Discharge Side of the Pump In the first embodiment of the invention 1, water is drawn through a coarse pre-filter 4 that is mounted to the inlet 28 of an electric submersible pump 5. The pre-filter 4 restricts particles, which are large enough to block the impeller, from entering the electric submersible pump. The electric submersible pump accelerates water into a high-velocity stream 16, and adds ambient air to the stream with an air supply tube 11, and a venturi eductor located in the stream nozzle. The amount of educted air is controlled by a valve 8 on the inlet of the air supply tube 11 that connects the submerged venturi eductor to ambient air outside the tank. The amount of air required, from 0 to 100% of capacity, depends on the needs of the user. The electric submersible pump can be mounted to the macerating/comminuting chamber top 13 by any method. The distance, that the pump outlet 29 penetrates into the inlet 30 of the macerating/chamber, can be set by spacers 12. Additionally, the power cord 7 and supply tube 11 are held neatly in place by a clamp 10, which hangs on the side of the aquarium 9.

The nozzle 29 of the pump 5 injects the stream 16 into a macerating/comminuting chamber 18. The macerating/comminuting chamber is constructed of four parts, a removeable top 13, an outer standard clear plastic tube, a bottom cap 19, and an internal micro-screen filter 14. The micro-screen cylinder 14 attaches by slipping over a nipple 34 in the center of the bottom cap 19. The macerating/comminuting chamber contains spheres 17 with a slightly greater specific gravity than water. The specific gravity of the comminuting spheres can vary depending on the needs of the user. Additionally, the material and shape of the macerating/comminuting spheres 17, or objects, can be changed depending on the needs of the user. The air infused injected stream creates an intense turbulent flow that fluidizes the spheres within an aerated froth. The turbulent flow and colliding spheres pulverize, or macerate, any organic particles. An orifice 15 at the top of the macerating/comminuting chamber allows excess air 6, which collects on the top of the chamber, to be bubbled off. Optionally, proteins that collect at the top of the macerating/comminuting chamber can be bubbled out of the chamber, via a tube to the outside of the tank, and into a cup, for collection and removal. This option is not shown in the first embodiment. A 40-micron "micro-screen" 14 covers the outlet of the macerating/comminuting chamber. The size of the lattice of the micro-screen can vary with the needs of the user. Because the screen forms part of the inner wall of the macerating/comminuting chamber, the inlet side of the screen is subjected to constant impacts from the fluidized spheres 17. The screen itself forms an anvil for the fluidized spheres to strike. This "hammer and anvil" process pulverizes or breaks free any large organic material that might block water flow through the screen 14. In this manner, the micro-screen is continuously self-cleaned by the fluidized spheres.

Organic particles smaller than the micro-screen filter lattice pass out of the chamber 18 into the filter down tube 23. Located within the down tube is a brush and impeller assembly. This assembly consists of: a stiff bristled brush 31, brush shaft 20, impeller 21, shaft spindle 32, and spindle block 22. When placed inside the down tube 23, water flowing across the impeller 21 causes it to rotate on the spindle axle 32, that is placed in a hole 33, centered in the spindle block 22. The stiff bristle brush reaches up inside the micro-screen cylinder 14 and is shaped to align with the inner surface of the micro-screen 14. When spun by the impeller 21, the spinning brush bristles continually impact and clean the discharge side of the micro-screen 14 with the same, previously stated, "hammer and anvil" process. The brush and impeller assembly is an optional assembly for slow velocity water flow. If the speed of the water flowing through the micro-screen 14 is fast enough, it automatically strips off attached flocks of bacteria and the micro-screen stays clean.

After the water and micro particles pass through the brush and impeller assembly, it continues on to the reverse flow gravel bed 24. The water, filled with micro particles, is carried via tubing 25 to the underside of the gravel and into under-gravel filter framework 27. The under-gravel filter framework creates a void for the water and micro particles to pass through. The pressure of the water forces it up through the under-gravel filter outlets 26. The water then passes into the gravel bed 24. The gravel bed of the under-gravel filter forms a media that is filled with microbes that denitrify the organic waste. Bubbles that are infused in the treatment stream oxygenate the bacteria. Additionally, the bubbles make their way to the under-gravel filter outlets and force their way up through the gravel. This assists the reverse flow in self-cleaning the gravel bead by breaking up dead spots and lifting out blockages of material that have settled downward from the tank above the gravel.

Finally, the treated and aerated water, with undesirable waste and by-products reduced, flows back into the tank, where it can repeat the cycle.

Figure 3:
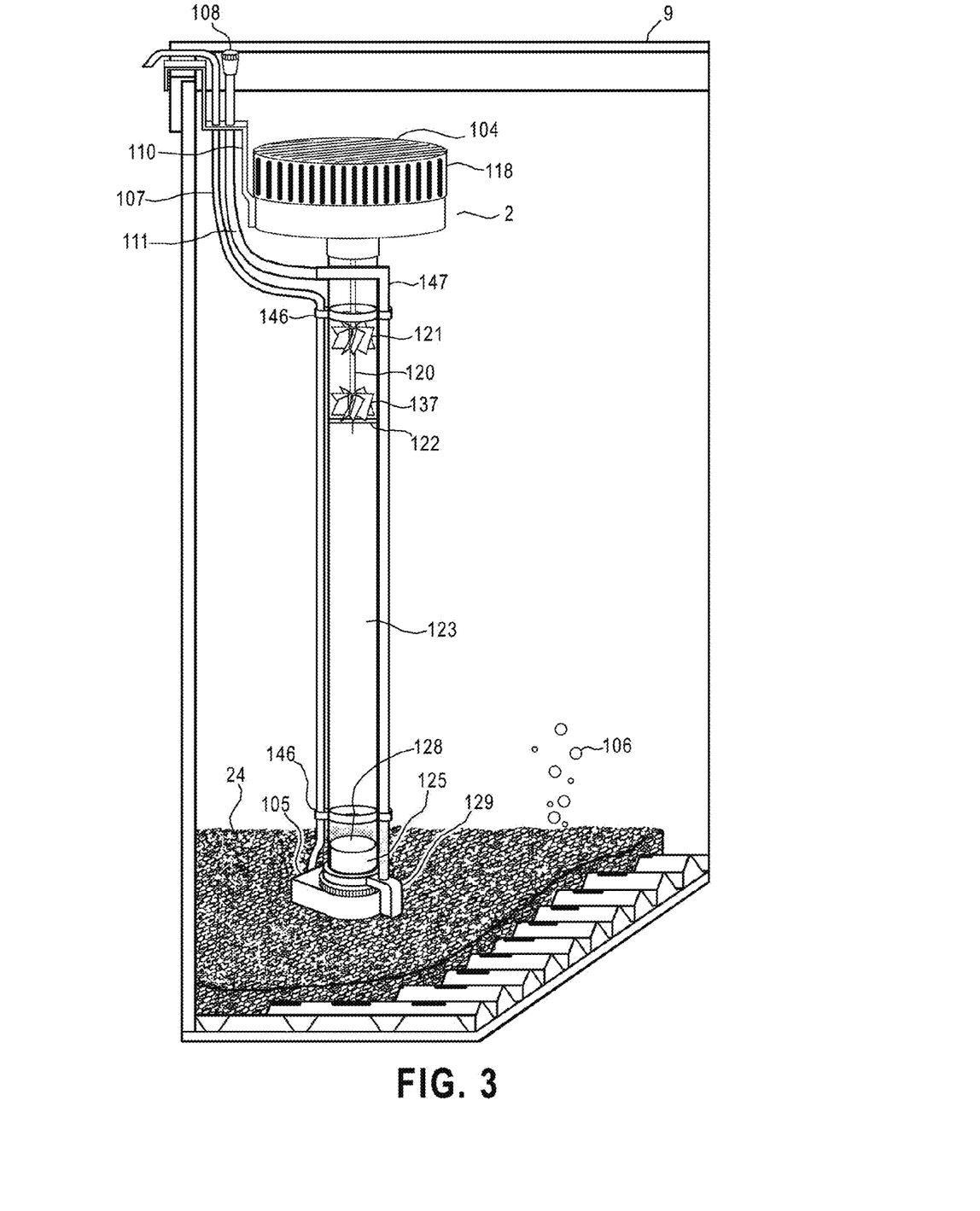
FIG. 3 shows a front perspective view of the second embodiment of the filter system, an under-gravel filter with the waste grinder and micro screen on the inlet side of the pump.
Figure 4:
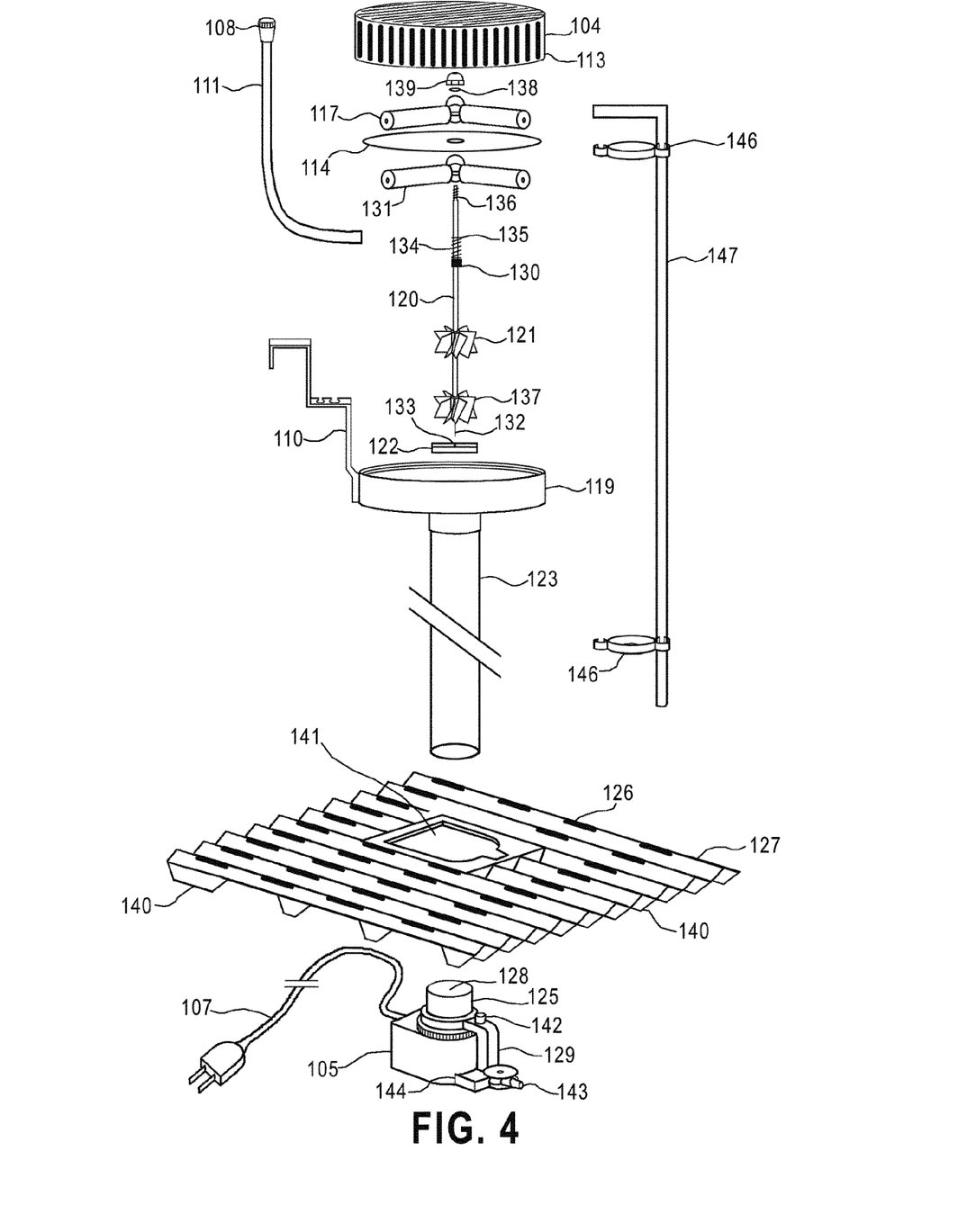
FIG. 4 shows an exploded perspective view of the second embodiment.

Continuously Self-Cleaning Reverse Flow Under-Gravel Filter Apparatus With a Macerating Chamber and Micro Filter Screen on the Inlet Side of the Pump In the second embodiment of the invention 2, the macerating chamber 18,118 is moved from the outlet side of the pump, as it was in the first embodiment, to the inlet side of the pump. This location reduces the backpressure on the venturi eductor located in the discharge 129 of the electric submersible pump 105, and thus, increases the potential amount of air that can be injected into the water stream. In this embodiment, water is drawn into the macerating chamber 118 through a coarse screen 104 on the chamber top cover 113. The coarse screen is designed to stop large objects and prevent fish from entering the macerating chamber 118. The macerating chamber 118 contains five major components: an inlet macerating multiple brush assembly 117, a fixed 40-micron "micro-screen" 114, an outlet macerating multiple brush assembly 131, an impeller shaft 120, and one or more impellers 121, 137. Both multiple brush assemblies 117, 131, when attached to the impeller shaft, rotate on a central axis formed by a hub opening in the center of the micro-screen disc 114. The impeller shaft 120 forms an axle that the brush assemblies are fixed to with splines. On the impeller shaft 120 there is a fixed stopper 130 that supports all of the inlet end components. The macerating components are arranged on the inlet end of the shaft in the following order from the stopper out: first, a spring 134 that supplies constant adjustable force compressing the brushes against the micro-screen; second, is a washer 135; third, is the outlet macerating multiple brush assembly 131 that slides onto the splines of the impeller shaft 120; fourth, the micro-screen disc 114 slides onto impeller shaft and spins freely; fifth, the inlet macerating multiple brush assembly 117 slides onto the splines of the shaft; sixth, a washer 138 slides on; and finally, an adjustable lock nut 139, screws onto the threads 136 on the end of the impeller shaft. On the discharge end of the impeller shaft 120 are multiple impellers 121,137 to add spinning force to the shaft, a shaft spindle 132, and spindle block 122. The shaft spindle fits into a hole 133 in the center of the spindle block 122. The spindle block 122 is located in the filter down tube 123, keeping the outlet end of the impeller shaft centered. When assembled, the micro-screen disc 144 is secured on its outer perimeter to the macerating chamber base 119. The chamber is complete when the chamber top cover 113 is snapped onto the top of the chamber base 119. When the macerating chamber is closed, the micro-screen is held secure and all of the other components can spin freely. The entire assembly is held in its position, in relation to the aquarium 9, by clamp 110.

When water is drawn in by the electric submersible pump 105, and flowing through this second embodiment of the invention, the vanes on the impellers 121,137 cause both, inlet 117 and outlet 131, macerating brush assemblies to rotate, while the micro-screen 114 is held secure. The spring 136 keeps the brushes constantly pressing against the micro-screen. The stiff bristles of the multiple brushes continuously strike the micro-screen, and pulverize or macerate any organic material that collects on the screen in a "hammer and anvil" manner. The stiff brush tips work like pointed hammers and the screen works like an anvil. As with the previous embodiment, this process continuously cleans the inlet side and outlet side of the micro-screen.

The water filled with micro organic material then passes down the filter down tube 123 and enters the inlet 128 of electric submersible pump assembly 105. The filter down tube attaches by sliding over a flange 125 on the inlet 128 of the pump. The electric submersible pump accelerates water into a high-velocity stream and adds ambient air to the stream with a venturi located in the pump nozzle 129. Two attached tubes, a ridged tube 147 and a flexible tube 111, connect the pump eductor to ambient air outside the aquarium 9. A valve 108, located on the inlet of the air tube 147,111, controls the amount of air injected into the water stream. The other end of the air tube connects to the pump air inlet 142. The amount of air required, from 0 to 100% of capacity, depends on the needs of the user. The air tube and the power cord 107 for the pump are held secure by clamps 146 on the down tube and to the side of the aquarium by clamp 110. The aerated water and micro organic particles then pass through the pump discharge 129, down under the gravel 24, to the underside of the under-gravel filter framework 127. The under-gravel filter framework 127 sits on extension legs 140, that create a 0.5-inch high void under the gravel 24. The under-gravel framework fits over the pump as shown at location 141. Attached to the discharge of the pump 129, is a nozzle 143 and a nozzle oscillating mechanism 144. The aerated discharge stream is swept across the bottom of the under-gravel framework by the nozzle and oscillating mechanism. This keeps the void clean and sprays bubbles 106 under the entire surface of the under-gravel framework. The pressurized water and bubbles 106 pass out of the under-gravel framework outlets 126 and up into the gravel bed 24. The gravel of the under-gravel filter forms the media that is filled with denitrifying microbes that break down the organic waste. Bubbles that are infused in the treatment stream make their way into the under-gravel filter and force their way up through the gravel. This aerates the tank water while breaking up dead spots in the gravel bed, caused by waste products settling from the aquarium above. Finally, the treated water, with reduced undesirable waste and by-products, flows back into the tank.

Figure 5:
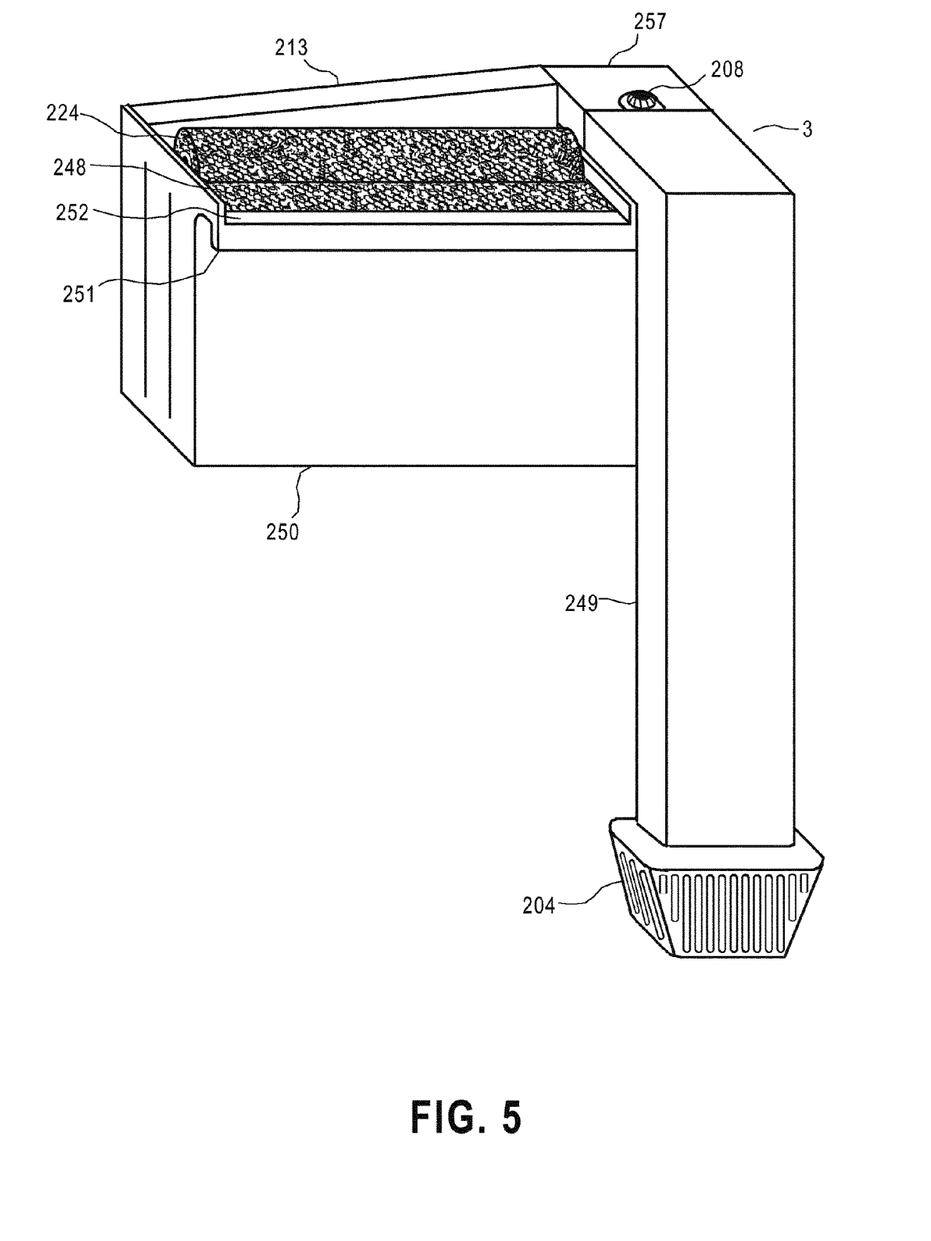
FIG. 5 shows a perspective view of the third embodiment of the filter system, an external box filter.
Figure 6:
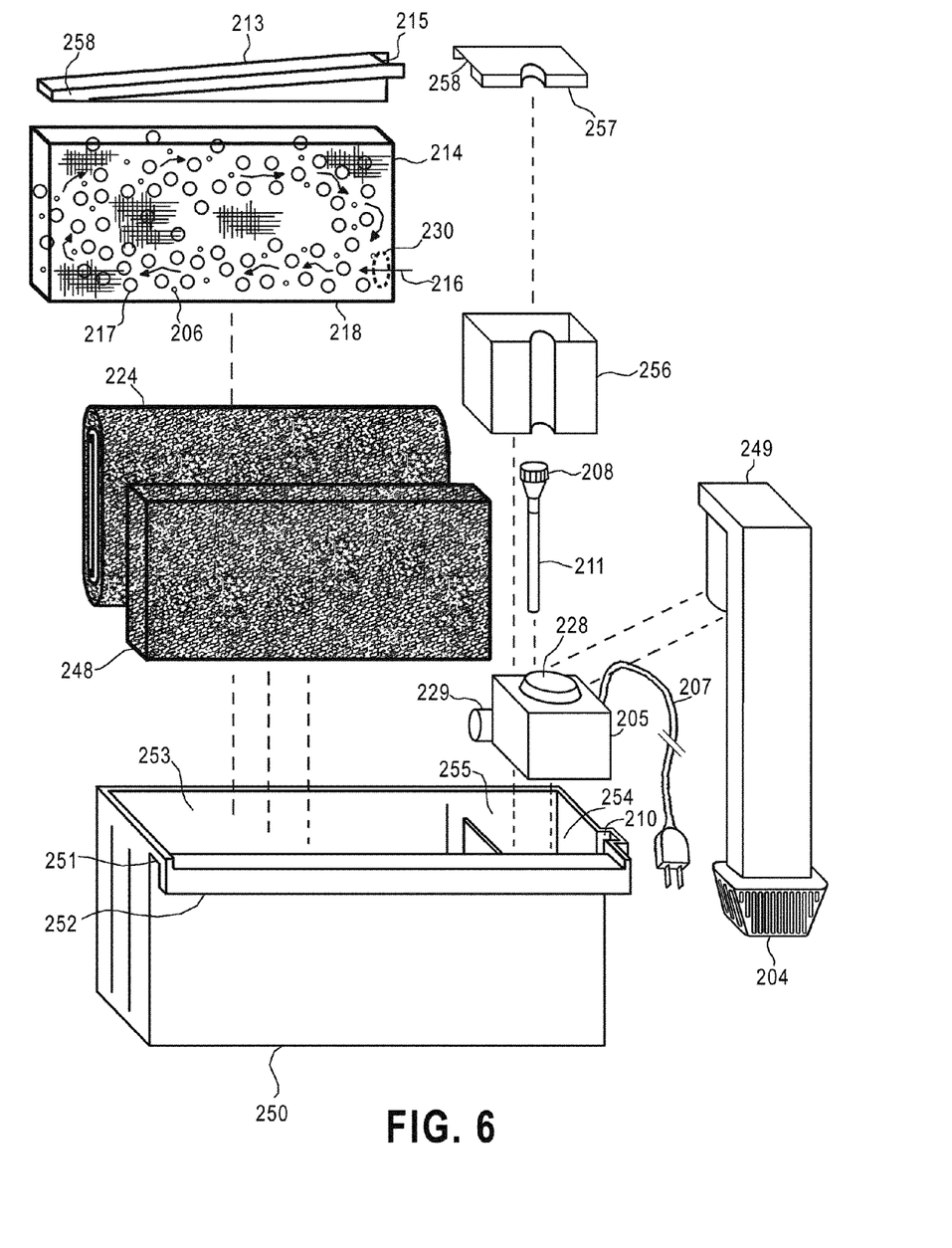
FIG. 6 shows an exploded perspective view of the third embodiment.

Continuously Self-Cleaning External Box Filter Apparatus With a Macerating/Comminuting Chamber and Micro Filter Screen on the Discharge Side of the Pump In the third embodiment 3, the invention is reconfigured to hang on the side of an aquarium 9 as a box filter unit. The method of the invention works the same whether it is configured for the inside or outside the aquarium 9.

In the box filter configuration, all of the components are contained within or connected to the main watertight filter box 250 in such a manner that any leaks in the system are directed away from the box sidewalls and across the overflow 252 back into the aquarium. The overflow structure also serves to form the hanger hook 251 for suspending the box on the side of the aquarium.

Untreated water is first drawn into the system through a coarse pre-filter screen 204. As with the previous embodiments, the coarse pre-filter screen 204 prevents large particles and fish from entering the electric submersible pump 205 impeller, yet, with large enough openings to allow sizeable organic waste particles to pass into filter system. The to-be-treated water is then drawn up through a pickup tube 249, and into the inlet 228 of an electric submersible pump 205. The electric submersible pump accelerates water into a high-velocity stream and adds ambient air 206 to the stream with a venturi located in the pump nozzle 229. The amount of injected air is controlled by a valve 208 on the inlet of the air supply tube 211 that connects the submerged venturi eductor to ambient air, above the water surface in the external filter box 250. The amount of air required, from 0 to 100% of capacity, depends on the needs of the user. The pump 205 sits in the bottom of the filter box 250, below the location shown by 254. The power cord 207 passes up through a conduit channel 210, formed into the side of the filter box. Once clear of the box, the cord can then be extended to a power outlet.

The outlet 229 of the pump 205 injects the pressurized and aerated 206 stream 216 into the inlet 230 of the macerating/comminuting chamber 218. Spheres 217, with a slightly greater specific gravity than water, are contained within the chamber 218. The specific gravity of the comminuting spheres can vary depending on the needs of the user. Additionally the material and shape of the macerating/comminuting balls, or objects, can be changed depending on the needs of the user. The air infused injected stream 216 creates an intense turbulent flow that fluidizes the spheres within an aerated froth. The turbulent flow and colliding spheres pulverize, or macerate, any organic particles.

Proteins that collect in the upper areas of the macerating/comminuting chamber 218 can be collected in a protein skimmer 213, which also serves as the top of the macerating/comminuting chamber 218. The proteins bubble up into the inlet 258 of skimmer 213, which is covered by a screen to prevent the comminuting balls from exiting the chamber. The proteins continue by bubbling up the channel to the outlet 215 that has a spout extending into a protein collection cup 256. The cup 256 is removeably mounted inside the filter box 250, above the pump discharge tubing, at location 255. The cup 256 can be pre-filled with a small amount of de-foaming agent, to instantly reduce the collected foam volume. Once the cup fills, it can be removed and emptied. If the cup should overfill, the overflow is contained within the filter box 250, and simply flows back into the tank. A small amount of baby shampoo can be added to the aquarium to assist in creating the bubbles for the protein skimming process. A cap 257 covers the top of the cup and is notched at 258 for the skimmer discharge spout 215.

A 40-micron "micro-screen" 114 covers the main outlet of the macerating/comminuting chamber 218. As with the previous embodiments, the user can choose the size of the screen lattice to meet specific filtration requirements. The removeable macerating/comminuting chamber 218 is shaped like a filter cartridge and takes up one third of the filter box compartment 253 when it is installed. Because the micro-screen forms part of the inner wall of the macerating/comminuting chamber, the inlet side of the screen is subjected to constant impacts from the fluidized spheres 217. This "hammer and anvil" process pulverizes or breaks free any large organic material that might block the screen. The screen itself forms the anvil, and the fluidized spheres form the hammers. In this manner, the inside of the screen is continuously self-cleaned.

Suspended air and organic particles smaller than the micro-screen filter lattice pass out of the chamber into a microbial digestion filter cartridge 224. The cartridge 224 media is mounted on a frame and two internal axles. When the cartridge is inserted into the filter box, the lower axle aligns and connects to a geared drive and motor. The cartridge removeably mounts into one third of location 253 of the filter box 250. When in use, the cartridge 224 slowly rotates. Part of the cartridge 224 extends above the water line of the filter box 250. The rotating, flexing, and draining keeps the cartridge 224 porous, and aerated. Additionally, the cartridge rubbing against the outside of the micro-screen 114, as it rotates, keeps the discharge side of the micro-screen clean. Therefore, both sides of the micro-screen, and the cartridge are self-cleaning. Since the processed waste is aerated and in micro particles, it additionally contributes to keeping the coarse matrix of the microbial digestion filter cartridge clear and unblocked. Denitrifying microbes living within the matrix of the microbial digestion filter cartridge 224 are able to feed on the oxygenated micro organic particles.

The next inline cartridge component to treat the water is a variable module cartridge 248 that can be chosen from multiple functional optional embodiments by the user. The available options are: a second microbial digestion filter cartridge; a chemical filter cartridge (charcoal, resin beads, ammonia remover), or an additional super fine micro filter cartridge that can be optionally added for special applications like clearing cloudy water. When in use, the cartridge 248 is inserted into the final third of location 253 of the filter box.

Treated water and excess air bubbles exit the filter box by flowing over a spillway 252 into the tank. Any remaining suspended air in the treated water spills into the tank to increase the oxygen levels in the aquarium.

Although the present invention has been described with reference to preferred embodiments, numerous modifications and variations can be made and still the result will come within the scope of the invention. No limitation with respect to the specific embodiments disclosed herein is intended or should be inferred.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art, that equivalent changes in form and detail may be made therein without departing from the true spirit and scope of the invention, and that the scope of the present invention is to be limited only to the claims except as precluded by the prior art. Moreover, the invention as disclosed herein may be suitably practiced in the absence of the specific elements, which are disclosed herein.

What I claim is:

1. A method for filtering water in an aquarium including the steps of:
   drawing water and waste material through a coarse screen into a pump;
   Increasing the velocity of the to-be-treated water and adding air to the stream;
   directing the high-velocity aerated stream into a macerating/comminuting chamber partially filled with objects, that are small enough to move freely throughout the chamber, and have a specific gravity high enough to develop inertia when moved by the stream;
   fluidizing the objects and water within the chamber;
   macerating organic material within the to-be-treated water with the objects impacting each other and the sidewalls of the chamber;
   constructing part of the chamber wall with a micro-screen, that also serves an outlet for treated water to exit said chamber;
   continuously cleaning the micro screen with the constant impacts of the fluidized objects;
   allowing only measured organic material to pass out of the chamber through the micro-screen, and into a porous media;
   treating the water with denitrifying microbes within the media;
   collecting and returning the treated water to the aquarium.

2. The method of claim one where the porous media is continuously self-cleaned.

3. The method of claim one where no air is added to the water stream.

4. The method of claim one where a treating gas is added to the stream.

5. The method of claim one where a protein skimmer is added to the macerating/comminuting chamber.

6. The method of claim one where the discharge side of the micro-screen is continuously self-cleaned.

7. The method of claim one where the comminuting/macerating chamber is located on the inlet side of the pump.

8. The method of claim one where the porous media is in the form a cartridge.

9. The method of claim one where additional specialized cartridges are added to the treating water stream.

10. The method of claim one where the measured organic material is optimally sized, to be easily digestible to denitrifying microbes.

11. A system and apparatus for filtering water in an aquarium, the apparatus comprising:
- an inlet tube with a coarse screen covering the inlet opening;
- a submersible electric pump that draws to-be-treated water into the coarse screen and pumps it into a macerating/comminuting chamber at a high-velocity;
- where the macerating/comminuting chamber is partially filled with objects that have a high enough specific gravity to develop inertia while submerged in water;
- where the high-velocity stream is directed into the macerating/comminuting chamber to fluidize the objects within the to-be-treated water;
- where organic material within the to-be-treated water is macerated by the objects impacting each other and the sidewalls of the chamber;
- where the micro-screen, also serves an outlet for treated water and micro organic particles to exit said chamber;
- continuously cleaning the micro screen with the constant impacts of the fluidized objects;
- measured organic material and water is passed out of the macerating/comminuting chamber through the micro-screen;
- where the water and organic material is directed into a porous media containing denitrifying microbes;
- collecting and returning the treated water to the aquarium.

12. The system of claim eleven where the porous media is continuously self-cleaned.

13. The system of claim eleven where air is added to the water stream.

14. The system of claim eleven where a protein skimmer is added to the macerating/comminuting chamber.

15. The system of claim eleven where the discharge side of the micro-screen is continuously self-cleaned.

16. The system of claim eleven where the comminuting/macerating chamber is located on the inlet side of the pump.

17. The system of claim eleven where the porous media is in the form a cartridge.

18. The system of claim eleven where additional specialized cartridges are added to the treating water stream.

19. The system of claim eleven where the measured organic material that passes through the micro-screen is optimally sized, to be easily digestible to denitrifying microbes.

20. The system of claim eleven where a treating gas is added to the stream.

* * * * *